H. L. BOYER.
APPARATUS FOR FORMING COMPOSITE BODIES OF RUBBER AND FIBROUS MATERIAL.
APPLICATION FILED APR. 9, 1917.

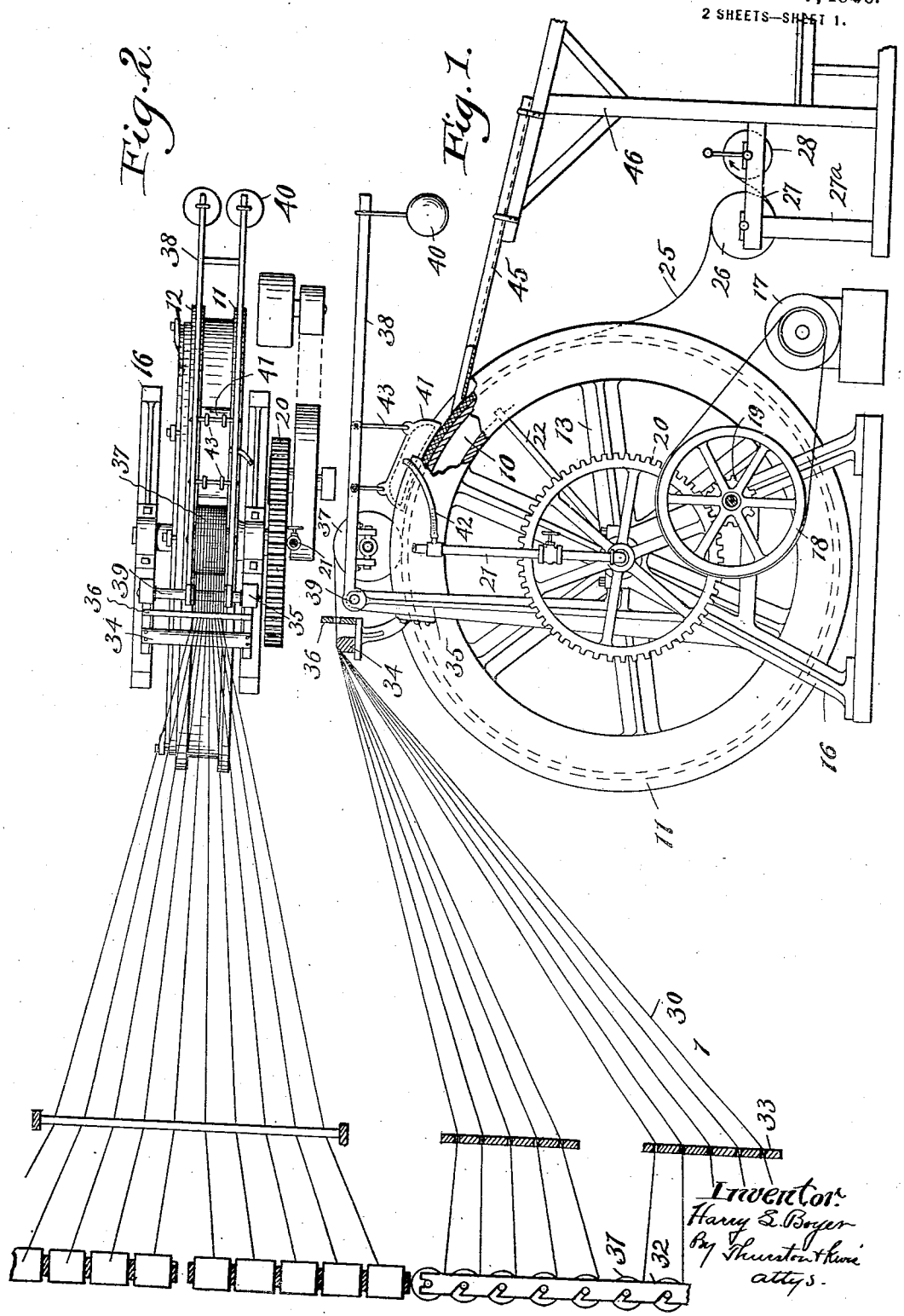

1,330,976.

Patented Feb. 17, 1920.
2 SHEETS—SHEET 2.

Inventor:
Harry L. Boyer
By Thurston & Kwis
attys.

UNITED STATES PATENT OFFICE.

HARRY L. BOYER, OF TRENTON, NEW JERSEY, ASSIGNOR TO JOSEPH STOKES RUBBER COMPANY, OF TRENTON, NEW JERSEY, A CORPORATION OF NEW JERSEY.

APPARATUS FOR FORMING COMPOSITE BODIES OF RUBBER AND FIBROUS MATERIAL.

1,330,976.   Specification of Letters Patent.   Patented Feb. 17, 1920.

Application filed April 9, 1917. Serial No. 160,620.

*To all whom it may concern:*

Be it known that I, HARRY L. BOYER, a citizen of the United States, residing at Trenton, in the county of Mercer and State of New Jersey, have invented a certain new and useful Improvement in Apparatus for Forming Composite Bodies of Rubber and Fibrous Material, of which the following is a full, clear, and exact description.

This invention relates to apparatus for forming a composite body of rubber and fibrous material, such for example, as may be employed in the manufacture of porous storage battery separators, packing and the like.

In accordance with the present invention, fibrous threads and soft uncured rubber in strip form are simultaneously applied onto a forming member, preferably in the form of a rotary drum, and are pressed or rolled into a compact homogeneous body so that the individual threads will be entirely surrounded or embedded in the rubber. To accomplish the best results the drum on which the rubber and threads are wound and compressed is heated, and in addition heat is preferably applied to the exterior of the strip, at and adjacent the point where the rubber and threads pass onto the drum.

The invention may be further briefly summarized as consisting in certain novel steps of the method, and combinations and arrangements of parts which will be described in the specification and set forth in the appended claims.

Figure 3:
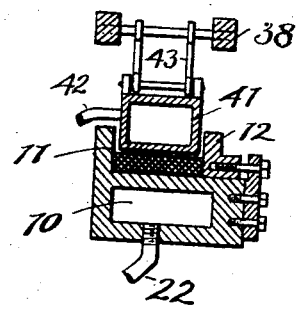
Figure 4:
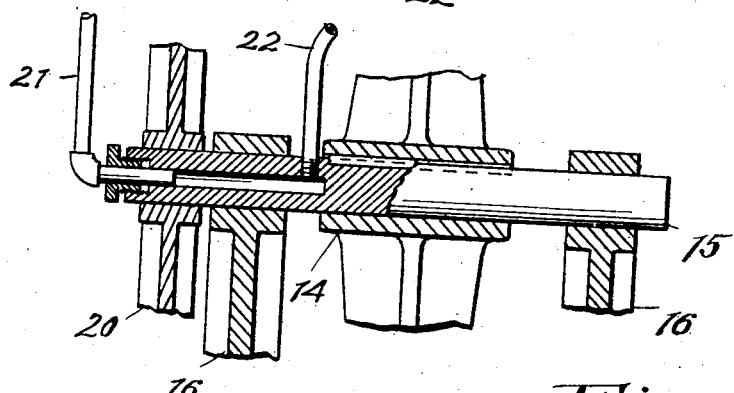
Figure 5:
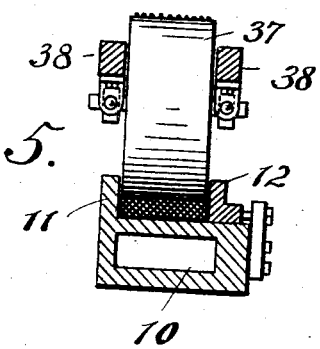

In the accompanying sheets of drawings wherein I have shown one embodiment of my invention, or apparatus which may be used to advantage in carrying out my invention, Figure 1 is a side view of the apparatus with parts in section; Fig. 2 is a top plan view of the major portion of the same; Fig. 3 is a sectional view through the rim or peripheral portion of the steam heated drum on which the rubber and threads are wound and compressed, and through the supplementary or external heating member which heats the materials, particularly the rubber, externally or from the outside of the drum; Fig. 4 is a detail sectional view showing particularly the manner in which steam is supplied to the shaft of the drum and from the shaft conveyed to the drum proper or hollow portion of the rotary member on which the rubber and threads are fed and compressed; and Fig. 5 is a detail sectional view through the peripheral portion of the drum and the coöperating roller between which the materials are fed and rolled or compressed.

Referring now to the drawings, it will be seen that the apparatus includes a drum, which in this case is in the form of a large wheel having a hollow circular rim portion 10 provided with outstanding flanges 11 and 12 (see Figs. 3 and 5) forming a grooved or channel-shaped periphery on which the materials to be referred to presently are fed and compressed. The drum proper, or hollow rim 10 is supported by radial spokes 13 and a hub 14 which is secured to a shaft 15 supported in bearings or bearing standards 16. The drum may be rotated in any desired manner, but in this case it is rotated by a motor 17, connected by a belt or chain to a pulley 18 which rotates a pinion 19 meshing with a gear 20 which is secured to the shaft 15. The drum is preferably heated by live steam which may be supplied in any suitable manner, but in this case it is supplied by a pipe 21 having a suitable swivel connection with one end of the shaft 15, this end being hollow, as shown in Fig. 4, and by a pipe 22 which extends from the shaft, as shown in Fig. 4, outwardly to the hollow rim portion or drum proper 10. It will be understood that I am not confined to this particular way of supplying steam to the drum, as other means may be employed if desired.

In accordance with my invention there are fed simultaneously onto the grooved periphery of the drum and compressed thereon, threads such as cotton threads and soft, plastic, uncured rubber in the form of a long strip. The rubber strip which is shown at 25, is fed from a roll 26, which in this case is supported on a frame 27. To prevent the successive layers of rubber on the roll 26 sticking together, said layers or convolutions are separated by a strip of cloth which is, of course, separated from the strip 25 as the latter is fed onto the drum. In this case the cloth strip shown at 27 is wound onto a reel 28 as it passes from the roll 26, at the same time that the strip 25 passes from the roll onto the drum. The individual threads which are also fed onto the drum are shown at 30, a large number of threads being supplied to the drum at one time. These threads are unwound from spools 31 supported in a suitable rack 32, and near the rack the threads pass through openings of guide plates 33. Near the drum, the threads pass over a horizontal guide strip 34, supported by upright standards 35 which extend upwardly alongside the drum; then the threads pass through closely spaced slots of a positioning and guiding member 36, likewise supported by the standards 35; then the threads pass around a rotary compressing member 37 which is at the top of the drum, and onto the grooved periphery of the drum.

Thus it will be seen that the rubber strip 25 and the threads 30 are drawn onto the drum by the rotation of the latter, and that they pass between the drum and the rotary compressing member 37, which is rotated by its engagement with the drum or the composite strip being formed thereon, and is of just sufficient width to fit in between the peripheral flanges 11 and 12 of the drum. This rotary compressing member 37 is supported by a pair of substantially horizontal supporting arms in the form of levers 38, which are pivoted at 39 to the upper ends of the standards 35, and at their outer ends carry weights 40 which pull the roller or rotary compressing member 37 down onto the drum or the strip being formed thereon with very great pressure which can, of course, be regulated by adjusting the positions of the weights 40 on the levers 38. In any event the pressure is such that the threads which are fed or laid down onto the rubber strip 25 as the latter passes between the roller and drum, are pressed down into the rubber so that they will be substantially completely surrounded or embedded therein, the number of threads being such that where they pass onto the drum they form a substantially complete layer, that is, arranged very nearly or substantially side by side, they extend across the periphery of the drum. Not only are the individual threads thus pressed well down into the rubber and substantially surrounded with the rubber, but by the pressure of the roller 37 an exceedingly compact composite strip of threads and rubber is formed which is free from openings or pockets, the air being completely squeezed from the successive layers of rubber as the latter pass under the roller 37 or between the two rolling compressing members.

To accomplish this result the rubber must be very soft at the time, or at the point that the threads are laid onto the strip and pressed into the same, and to this end the drum is heated with live steam which may be supplied in the manner previously described, thus heating the rubber from within the drum. Additionally, I prefer to provide an external heater which overlies the strip being fed to the core. This heater is preferably in the form of a hollow curved jacket 41, which encircles a or arc-shaped portion of the drum and is close to the outermost strip as it is being applied, and just before it passes between the drum and roller 37 and receives the threads. This arc-shaped jacket 41 may be supplied with steam from the pipe 21, a suitable connecting pipe or tube 42 being shown in Fig. 1.

Inasmuch as the thickness of the strip which is being formed on the drum increases to an extent with each revolution of the drum, it is essential that the roller be capable of moving outwardly slightly as the strip builds up between the latter and the drum. For this reason the roller is supported on the pivoted levers 38, from which the weights are suspended. As it is desirable that the external jacket 41 be very close to the composite strip being formed from the rubber and threads, and therefore close to the strip 25 before it passes between the roller and drum, it is desirable that this jacket also be supported so that it will gradually move outward as the thickness of the composite strip increases, and therefore this jacket is suspended by links 43 from the same levers 38 which carry the roller 37.

When a composite strip of rubber and threads of the proper thickness is formed on the grooved periphery of the drum, the machine is stopped and the strip is removed from the drum by cutting it at one point, transversely from edge to edge, and by then running the strip off the drum. That the strip may be readily removed from the drum I provide a chute or platform 45, which is supported on a suitable frame 46, and can be run up to the periphery of the drum as shown, or slid back therefrom. When it is desired to remove the strip, cut across in the manner explained, it is run up close to the drum, and the composite strip is unwound or drawn from the drum, and as this is done the strip slides down along the chute 45 to a suitable receiving table not shown. The process is then again repeated to form another composite strip from the rubber and threads, and when the strip is of the desired thickness it is removed in the manner explained. In this manner the composite strips are formed one after the other.

A suitable number of these composite strips are placed one above the other between heavy compressing plates of a vulcanizer, (not shown) and are pressed firmly together and partly or wholly vulcanized. Preferably the body thus formed from the superimposed composite strips is first partially vulcanized so that it can be readily cut into sections or strips of the desired thickness.

As before stated, one of the purposes of this invention is to produce porous separators. To produce the latter the composite body partially vulcanized in the manner above explained, is removed from the vulcanizer and placed in a slicing machine, and is then sliced into thin separator sections, the slicing being done at right angles to the threads so that the threads extend transversely across each cut section, and are uniformly and very closely spaced over the entire face of the section. These threads therefore form minute pores and render the article or section very suitable for use as a storage battery separator. Of course before it is used as a separator the section will be further vulcanized so as to render it hard, and it may be provided with ribs or projections on one or both faces.

While I have explained in some detail one of the ultimate uses to which my invention may be applied, namely, the making of porous storage battery separators, I wish to make clear that the invention is not necessarily confined to that use, but the composite body which is formed, may be employed for making other articles such as packing as before stated.

It will be observed from Fig. 3, that one of the peripheral flanges 11 of the drum is integral with the drum, and therefore fixed, and that the other flange 12 is adjustable toward and from the flange 11. By making one of the peripheral flanges adjustable, the space between the flanges can be varied, and therefore the width of the composite strip which is formed on the drum can be varied.

I do not desire to be confined to the precise details or precise steps shown or described, but aim in my claims to cover all modifications which do not involve a departure from the spirit and scope of my invention.

Having thus described my invention, what I claim, is:

1. In an apparatus for forming a composite body of rubber and fibrous material, a rotary drum on which the strip is adapted to be built up, a compressing roller at the periphery of the drum, a source of supply of strip rubber adapted to be supplied to the drum, a rack containing a quantity of spools of fibrous threads adapted to be fed to the drum, and means for guiding the threads so that as the rubber and threads are fed to the drum and pass between the drum and roller, the threads will be embedded in the rubber.

2. In an apparatus for forming a composite body of rubber and fibrous material, a rotary drum on which the strip is adapted to be built up, a compressing roller at the periphery of the drum, a source of supply of strip rubber adapted to be supplied to the drum, a rack containing a quantity of spools of fibrous threads adapted to be fed to the drum, means for guiding the threads so that as the rubber and threads are fed to the drum and pass between the drum and roller, the threads will be embedded in the rubber, and means for heating the rubber strip and the composite body being formed on the drum.

3. In an apparatus for forming a composite strip of rubber and fibrous material, a rotary drum, a compressing roller at the periphery of the drum, and a heating jacket adjacent to the periphery of the drum and supported independently of the latter.

4. In an apparatus for forming a composite strip of rubber and fibrous material, a rotary drum, a compressing roller at the periphery of the drum, means for supplying a heating medium to the drum, and means for heating the rubber externally of the drum as the rubber is applied thereto.

5. In an apparatus for forming a composite strip of rubber and fibrous material, a rotary drum, a compressing roller at the periphery of the drum, means for supplying a heating medium to the drum, and a relatively stationary heating jacket arranged opposite a portion of the periphery of the drum so as to heat the materials externally of the drum as the latter is rotated and the materials are drawn onto the same.

6. In an apparatus for forming a composite strip of rubber and fibrous material, a rotary drum, a compressing roller at the periphery of the drum, means for supplying a heating medium to the drum, and a heating jacket arranged opposite a portion of the periphery of the drum so as to heat the materials externally of the drum, and a movable support for the jacket adapted to support the jacket adjacent to the drum and permit the jacket to move outwardly as the thickness of the composite strip increases.

7. In an apparatus for forming a composite strip of rubber and fibrous material, a rotary drum on which a composite strip is adapted to be built up by materials wound thereon, means for feeding rubber in strip form and fibrous material to the drum, a compressing roller at the periphery of the drum, and a delivery platform movable toward and from the drum and adapted to support the strip when it is cut transversely and drawn off the drum.

8. In an apparatus for forming a composite strip from rubber and fibrous material, a drum on which rubber and fibrous material are adapted to be supplied simultaneously, a roller arranged opposite the drum and adapted to compress the materials thereon, a heating jacket arranged opposite a portion of the periphery of the drum, and supporting means for the roller and jacket which enable both the latter to yield or move outwardly as the thickness of the composite strip being formed increases.

9. In an apparatus for forming a composite strip from rubber and fibrous material, a rotary drum having external peripheral flanges forming a grooved periphery into which rubber and fibrous materials are adapted to be fed and compressed, one of said flanges being laterally adjustable whereby the width of the composite strip may be varied.

In testimony whereof I hereunto affix my signature.

HARRY L. BOYER.